United States Patent [19]

Trijssenaar

[11] Patent Number: 5,042,370
[45] Date of Patent: Aug. 27, 1991

[54] APPARATUS FOR PROVIDING A FOOD PRODUCT WITH A THREAD-LIKE SUSPENSION MEANS

[75] Inventor: Gerardus L. Trijssenaar, Brigantijn 15, 3448 KB Woerden, Netherlands

[73] Assignees: N.J. Lunenburg B.V.; Gerardus L. Trijssenaar, Netherlands

[21] Appl. No.: 553,990

[22] Filed: Jul. 16, 1990

[30] Foreign Application Priority Data

Jul. 31, 1989 [NL] Netherlands ......................... 8901974

[51] Int. Cl.[5] .......................... A22C 9/00; A22C 17/00; A22C 17/12
[52] U.S. Cl. .......................................... 99/492; 99/419; 99/533; 112/2; 452/30; 452/187
[58] Field of Search ..................... 99/419, 421 R, 485, 99/486, 489, 492, 515, 532, 533, 646 R; 452/30, 185–187, 141, 142; 112/2, 80.05, 80.16, 400

[56] References Cited

U.S. PATENT DOCUMENTS

| 1,507,696 | 9/1924 | Tosadori | 452/185 |
| 1,855,175 | 4/1932 | Braudes | 112/80.16 |
| 2,152,493 | 3/1939 | Newman | 112/2 |
| 2,519,528 | 8/1950 | Williamson | 452/187 |
| 2,811,743 | 11/1957 | Crabtree Jr. | 452/142 |
| 3,656,424 | 4/1972 | Evanson | 99/533 |
| 3,683,789 | 8/1972 | Beasley | 99/533 |
| 3,885,508 | 5/1975 | Hofmann et al. | 112/262.2 |
| 4,055,872 | 11/1977 | Wagner | 452/141 |
| 4,408,519 | 10/1983 | Schill | 99/492 |
| 4,953,456 | 9/1990 | Prosenbauder | 99/533 |

FOREIGN PATENT DOCUMENTS

| 0215732 | 3/1987 | European Pat. Off. | 452/186 |
| 3933026 | 4/1990 | Fed. Rep. of Germany | 452/186 |
| 1128889 | 12/1984 | U.S.S.R. | 452/186 |

Primary Examiner—Timothy F. Simone
Attorney, Agent, or Firm—Kane Dalsimer Sullivan Kurucz Levy Eisele and Richard

[57] ABSTRACT

An apparatus for providing a food product with a thread-like suspension means comprises a needle for passing the thread loop-like through the food product. Further two gripper means, a cutting means and a connecting device for the thread are provided. Preferably the connecting device comprises an ultrasonic welding head for welding together the ends of a thread section disengaged by the cutting means. The apparatus further comprises curved discs for driving at least some of the operational means.

16 Claims, 8 Drawing Sheets fig.1 fig.2 fig.3 fig.4 fig.5 fig.6 fig.7 fig.8

APPARATUS FOR PROVIDING A FOOD PRODUCT WITH A THREAD-LIKE SUSPENSION MEANS

The invention relates to an apparatus for providing a food product, such as meat or alike, with a thread-like suspension means, comprising a needle movable to and fro for passing the thread loop-like through the food product.

A known apparatus for providing a food product with a thread-like suspension means comprises a pin-shaped auxiliary instrument, that near to its forward end comprises a receiving slot in which a loop-like suspension means can be hooked. At one end this loop-like suspension means is provided with a disc-shaped enlargement. By means of the auxiliary instrument the suspension means is led through the food product, such as a piece of meat or alike, with its end facing away from the enlargement until the enlargement obstructs moving further the suspension means. The opposite end of the suspension means then already has been led through the food product and creates at the respective side thereof a loop with which the food product can be suspended.

Providing the loop-like suspension means using the auxiliary instrument is carried out manually. Although the suspension means obtained fulfills the requirements applying it is a tough and tiring job. Moreover, there is a chance on contamination of the meat.

It is an object of the invention to provide an apparatus for providing a food product with a thread-like suspension means that operates completely automatically and that does not have the above-mentioned disadvantages.

Thus the apparatus for providing a food product with a thread-like suspension means is characterized in that the needle comprises a thread guide, the thread extending from a thread supply through the thread guide towards the point of the needle and, for defining the loop, at the outside of the needle back again, the apparatus comprising a first gripper means for gripping the thread end projecting from the thread guide and holding it while moving the needle through the food product, a second gripper means for gripping the thread loop after being moved entirely through the food product by means of the needle, a cutting means for cutting the thread between the second grip per and the point of the needle, and a connecting device for connecting the two ends of the thread section disengaged from the supplied thread and held by the gripper means.

The apparatus according to the invention operates according the so-called double-thread principle. A formost part of the thread is led loop-like through the food product, whereas the thread end projecting from the thread guide is held in front of this food product. After passing the food product the thread is cut at its loop-like formost end whereafter the ends of the thread section disengaged like this are interconnected. As a result a suspension means is manufactured that can be removed from the food product only by cutting the thread. Providing the suspension means with the aid of the apparatus according to the invention occurs entirely automatically.

In a preferred embodiment of the apparatus according to the invention a driving box comprising curved discs is provided for driving at least the gripper means, the cutting means and the connecting device, said curved discs driving respective hauling and pressure cables connected with the said means and the connecting device.

For obtaining a correct sequence of motions of the several parts of the apparatus and for obtaining a correct synchronisation between these parts the use of curved discs is preferred, for principally each desired sequence of motions can be realized therewith. Moreover, application of a driving box comprising curved discs offers the big advantage that high operational speeds of the apparatus may be obtained. Thus a large amount of food products can be processed per unit of time, such that the apparatus obtained is very economically.

Further it is handy, if the driving box further comprises a compensating curved disc engaged by a spring-loaded abutment means, the spring load and the shape of the compensating curved disc being such that the resulting torque applied to a driving motor of the driving box by the curved discs and the compensating curved disc continuously remains constant. Due to the application of such a compensating curved disc the load on the driving motor of the driving box remains constant, such that the driving box runs extremely regularly. By making an appropriate choice of the shape of the compensating curved disc it is even possible to lower the maximum required power of the driving motor.

According to a further advantageous embodiment of the apparatus according to the invention the driving box further comprises a crank gear for driving the needle. In relation therewith it is possible than that the needle drive can be disengaged automatically from the driving box when the needle hits a hard object in the food product, such as a bone. Thus at one hand damaging the needle is prevented, whereas at the other hand it is prevented that for example a bone in the food product is splintered, such that undesired splinters remain in the food product.

Further it is advantageous if an automatic resetting mechanism is provided for resetting the driving box and the needle towards the starting position after the needle being disengaged. If, as a result of the needle hitting a hard object, the crank gear is disengaged the mutual relation between the several parts of the apparatus may be reset automatically by means of the automatic resetting mechanism, such that the apparatus again is ready to carry out a new cycle.

As a preparation to interconnecting the ends of the disengaged thread section it is possible, that the first gripper means, after gripping the thread end, and the second gripper means, after gripping the thread loop and cutting the thread by the cutting means, are movable such that the ends of the disengaged thread section are positioned against each other.

It is handy, if the connecting device comprises an ultrasonic welding head known per se. Thus the ends of the disengaged thread section may be interconnected in a quick and reliable way.

According to an other embodiment of the apparatus according to the invention the thread supply comprises a thread drum and wherein a thread buffer device is provided between the thread drum and the needle, such that thread is wound off from the thread drum only after the needle has entirely pierced the food product. If the needle cannot entirely pierce the food product, for example if a hard object such as a bone or alike is present in said food product, the needle generally will be moved back towards its starting position. If in such a case thread already would have been wound up from the thread drum this thread would depend loosely when the needle moves back towards its starting position. Due to the application of the buffer device however, this is prevented. Only after the needle has entirely pierced the food product, thereby forming a loop-like suspension means, thread is wound of from a thread drum.

In this aspect the apparatus may be realized in such a way, that the buffer device comprises two series of relatively off-set thread guide rolls of which one series is stationary and of which the second series is positioned below the first series and on a pivotable carrier, the thread being led alternatingly around the thread guide rolls of the first and second series, the pivotable carrier being connected with a thread drum brake in such a way that the brake releases the thread drum when the carrier has pivoted over a preset angle towards the first series of thread guide rolls, the carrier being loaded away from the first series of thread guide rolls. When moving the needle through the food product the thread is tightened such that both series of thread guide rolls are moved towards each other. When the needle is moved back before it has entirely pierced the food product (for example after hitting a bone or alike) the thread is somewhat slackened as a result of which both series will be positioned at a greater distance from each other. Only if the needle entirely pierces the food product the series positioned on the carrier will be displaced that far that the brake releases the thread drum thus winding off thread from the thread drum. After a certain amount of thread has been dispensed the brake will again engage the thread drum and stop it.

Hereinafter the invention will be elucidated by means of the drawing, in which an embodiment of the apparatus according to the invention is illustrated.

Before describing in more detail the apparatus illustrated in the figures the following is noted. For carrying out its specific function, thus providing a thread-like suspension means in a food product, the apparatus according to the invention comprises several movable parts. For obtaining specific motionary tracks followed by these parts among others advanced rod mechanisms are used. Although these rod mechanisms are essential for a good operation of the apparatus a detailed discussion of the development process of these rod mechanisms lies outside of the scope of the present invention. It is noted only that determining several parameters of the rod mechanisms is carried out using advanced computing methods.

Figure 1:
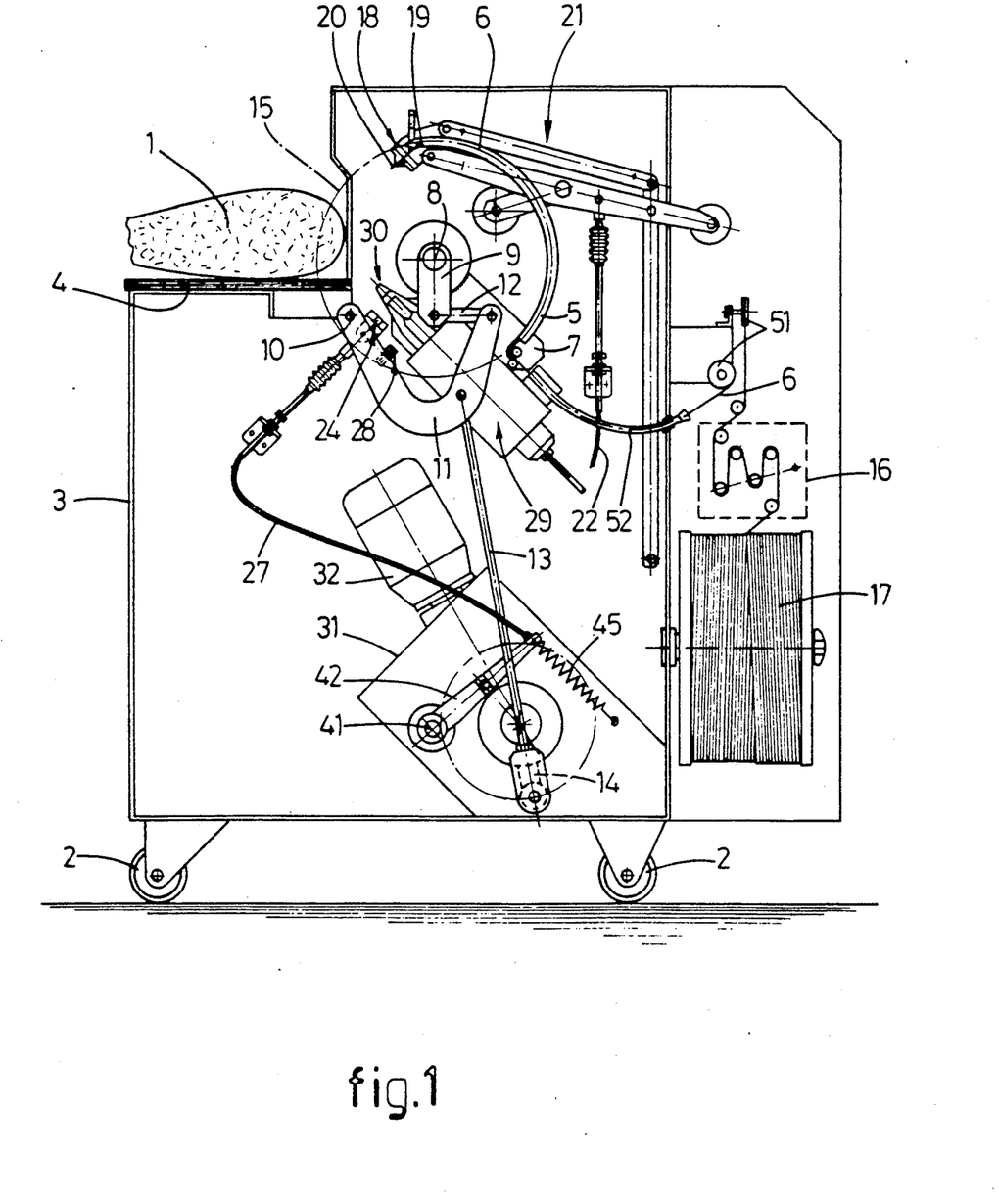
FIG. 1 shows, partially schematically and partially broken away, a side-elevational view of an embodiment of the apparatus according to the invention.

FIG. 1 shows, partially broken away, a schematic side-elevational view of an embodiment of the apparatus according to the invention. This apparatus is fit for providing a food product, such as a piece of meat 1 or alike, with a thread-like suspension means. The apparatus comprises a casing 3 mounted on wheels 2 inside of which all of the parts of the apparatus are housed. At the upper side of the casing 3 a product support 4 is provided on which a food product to be processed may be positioned. At the product support the casing 3 comprises a slot-like opening, not visible in this figure, through which a hollow needle 5 may be led through the piece of meat 1. Through this hollow needle 5 a thread or any other strip-like material extends, from which a loop-like suspension means has to be manufactured and which should be led through the piece of meat 1 by means of the needle 5.

As will be elucidated later in FIGS. 2 until 5 the apparatus according to the invention operates according to the double thread principle.

The hollow needle 5 is attached to a support arm 7 that is mounted on a pivotable shaft 8. This pivotable shaft 8 further carries a shaft driving arm 9 which is driven by means of a rod mechanism comprising a pivot arm 11 pivotable around the stationary pivot 10 and a connecting rod 12 connecting the end of the pivot arm 11 opposite to the stationary pivot 10 with the end of the shaft driving arm 9 opposite to the shaft 8. Finally the pivotal motion of the pivot arm 11 around the stationary pivot 10 is obtained by a crank gear having a drive rod 13 attached to a crank rod 14 (see FIG. 6).

As appears clearly from FIG. 1 the hollow needle 5 is partially circular and follows a circular track that in FIG. 1 has been indicated schematically by a dashed and dotted line 15. As a result of the drive by means of the crank gear 13, 14 and the rod mechanism 9 until 12 the hollow needle 5 will carry out a to and fro movement. As will be elucidated in FIG. 6 the drive of the needle too is embodied such, that after carrying out one cycle, that is after one to and from movement, the needle will stop. For moving the needle again it has to be activated again by an operator.

Thus the thread is supplied from a thread drum 17 via several thread guiding rolls and a buffer device 16 indicated only schematically. The operation of the buffer device 16 will be illusidated further in FIG. 8.

The apparatus comprises a first gripper means 18 for gripping the thread end 20 projecting from an opening 19 of the needle 5. By means of a rod mechanism 21 not illustrated in detail this first gripper means 18 is movable vertically upwards and downwards along a substantially straight line. The drive of the rod mechanism 21 occurs by means of a hauling and pressure cable 22 driven in a way illustrated further in FIG. 6.

Figure 2:
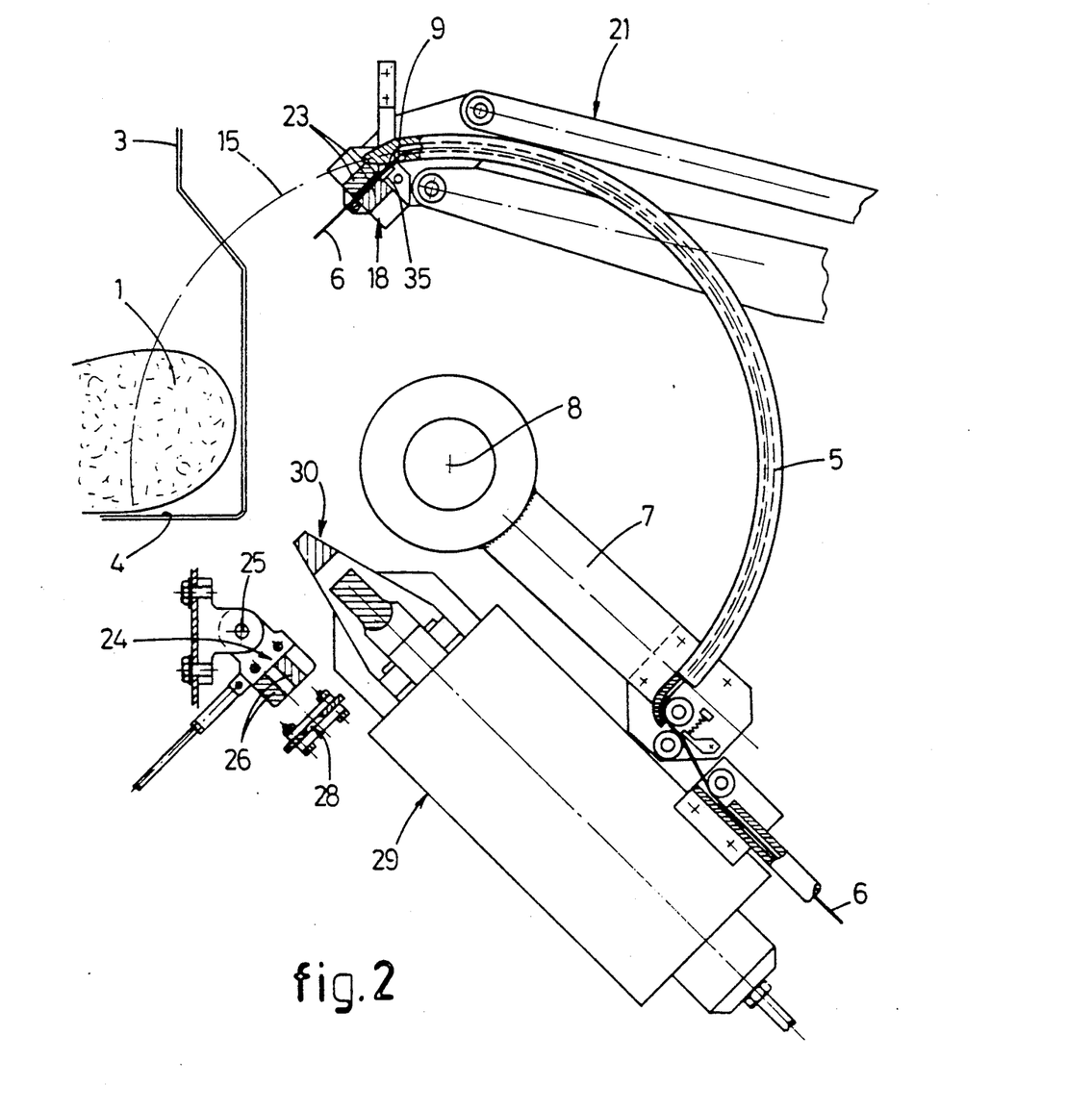
FIGS. 2 until 5 show on a larger scale a part of the apparatus according to FIG. 1 during successive steps of providing a suspension means.

Apart from the mentioned vertical up and down movement the first gripper means 18 also obtains a second movement, that is opening and closing of two cooperating jaws 23 (see FIG. 2 until 5). Opening and closing of these jaws is obtained by means of a not represented hauling and pressure cable too.

The apparatus further comprises a second gripper means 24 pivotable around a stationary pivot 25. The pivotal motion of this second gripper means 24 as well as opening and closing its two jaws 26 again is obtained by a hauling and pressure cable 27 and a not represented hauling and pressure cable, respectively. The function and operation of the second gripper means 24 will be elucidated further in FIGS. 4 and 5.

Further the apparatus is provided with a cutting means 28, with which the thread 6 after being led through the piece of meat 1 can be cut. Activation of the cutting means 28 again occurs by means of a (not represented) hauling and pressure cable.

The apparatus shown in FIG. 1 further comprises a welding device 29 (sonotrode) for welding together the two ends of the thread section 36 led through the piece of meat 1. In the shown embodiment the welding device 29 operates ultrasonically.

For obtaining an effectively operating apparatus the welding device 29 initially is not positioned in the plane of thread 6. In FIG. 1 this means that the welding device 29 initially is positioned behind the plane of the drawing. After the two ends of the respective thread section to be connected have been positioned in close vicinity (using the two gripper means 18 and 24 in a way to be described hereinafter) the welding device 29 is displaced over some distance perpendicularly to the plane of the drawing (the activation again occurring by a hauling and pressure cable), until the operative part of this welding device 29, that is the welding head 30, is located at and in the plane of the thread 6, that is at its both ends. Next the welding head 30 is activated, again using a hauling and pressure cable, for carrying out the welding process.

Finally FIG. 1 shows a driving box 31 in which a shaft 33 is provided driven by a motor 32, said shaft bearing a number of curved discs 34. The function and operation of these curved discs 34 will be elucidated in FIG. 6.

Figure 7:
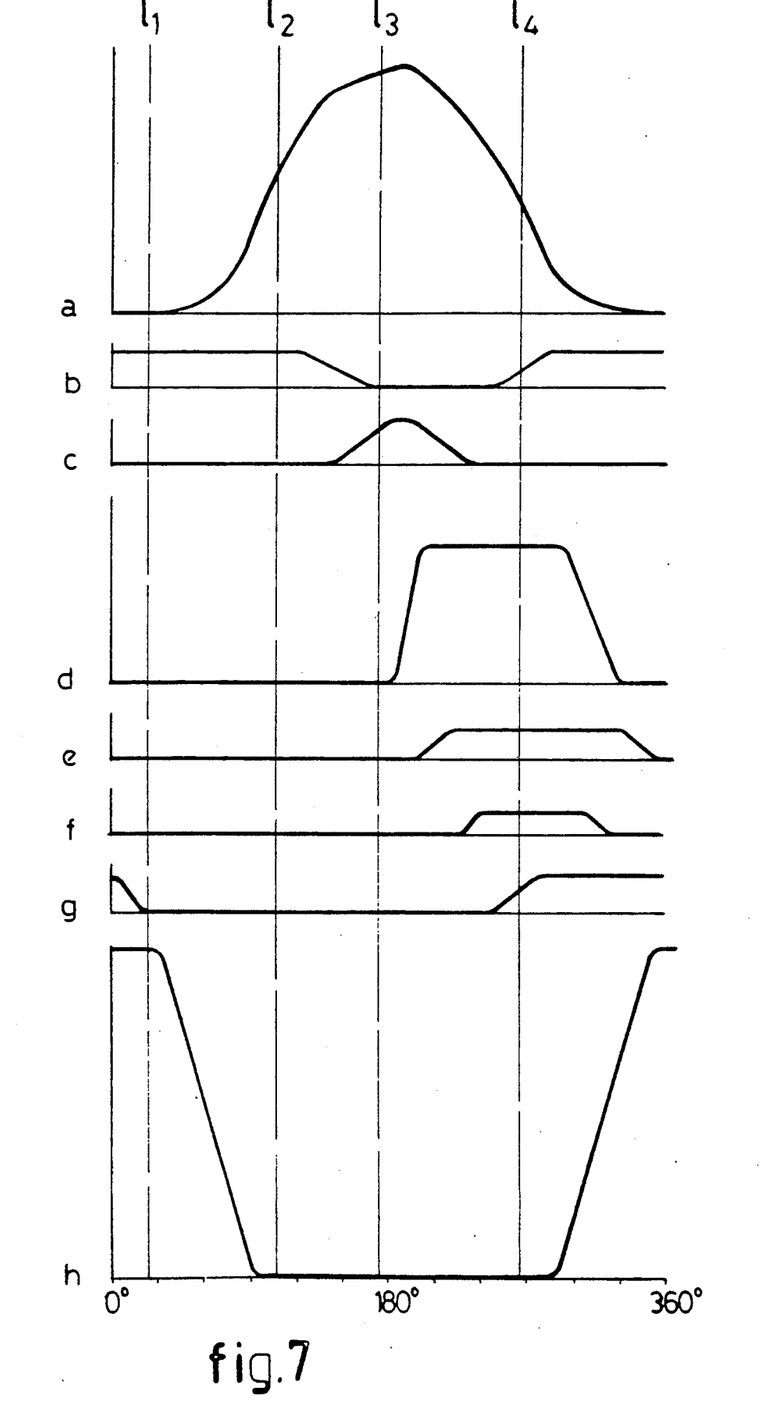
FIG. 7 shows motional diagrams of several parts of the apparatus according to FIG. 1.

Before now elucidating the operation of the apparatus according to the invention using FIGS. 2 until 5 reference is made to FIG. 7. In this figure the mutual relation between the motions of the movable parts of the apparatus is shown. This figure represents motional diagrams, in which on the horizontal axis the rotational position of shaft 33 of the driving box 31 is represented. The total scale therefore corresponds with one rotation of this shaft 33. On the vertical axis the motional positions of several parts are represented. The motional diagrams illustrated in FIG. 7 relate to the following parts and their motions:

(a) rotational movement of the hollow needle around shaft 8, in which the vertical axis represents the angular rotation relative to the starting position (0°);

(b) the closing movement of the second gripper means 24, in which the vertical axis represents the distance between the jaws (thus completely opened at 0°);

(c) the operation of the cutting means (not operative at 0°);

(d) pivotal movement of the second gripper means 24 around stationary pivot 25 (not pivoted at 0°);

(e) movement of the welding device 29 perpendicularly to the plane of the drawing in FIG. 1, said welding device not being positioned in the plane of the thread 6 at 0°;

(f) activation of the welding head 30 of the welding device 29 (not activated at 0°);

(g) closure movement of the first gripper means 18, in which on the vertical axis the distance between the jaws has been represented (thus opened at 0°), and (h) vertical up and down movement of the first gripper means 18, being shown in FIG. 1 in its uppermost position at 0°.

The absolute values of the displacements of the several parts, as represented in the motional diagrams according to FIG. 7, are of less importance per se. Only important is the mutual relation between several motions.

Reference is made now to FIG. 2. The moment corresponding with the position according to FIG. 2 has been represented with a dashed line $l_1$ in FIG. 7. During the previous reversed motion of the hollow needle 5 the thread end of thread 6 projecting from opening 19 has contacted a guiding abutment 35, thus correctly positioning this thread end relative to the first gripper means 18. This first gripper means 18 is opened while positioning the thread end. Immediately after this positioning of the thread end has been completed the first gripper means 18 is closed whereby its both jaws 23 clamp thread 6. This position is represented in FIG. 2.

The second gripper means 24 is in its downwardly pivoted position, in which jaws 26 are opened. The cutting means 28 is opened too, while the welding device 29 is in its position outside of the plane of the thread 6. The welding head 30 is opened.

In the position of the apparatus shown in FIG. 2 a piece of meat 1 has already been provided. Now the apparatus may be activated for firstly reaching the position illustrated in FIG. 2, in which the first gripper means 18 has gripped thread 6.

Figure 3:
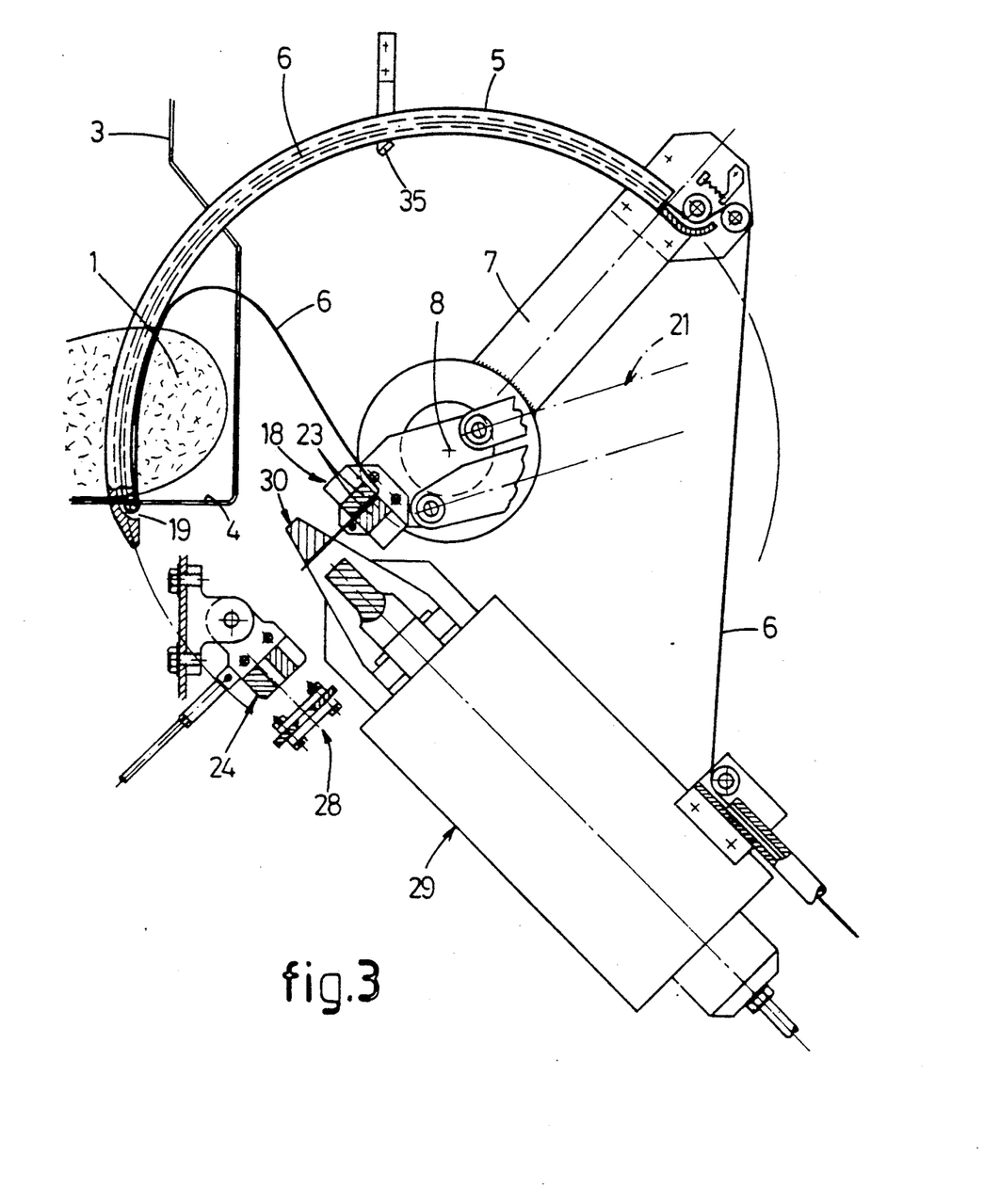

The position of the apparatus shown in FIG. 3 has been indicated in FIG. 7 by means of dashed line $l_2$. In this position the first gripper means 18 has been moved to its lowermost position (FIG. 7h) by means of the respective rod mechanism 21, in which position the thread end held by the jaws 23 is positioned near to the welding head 30 of the welding device 29. The hollow needle 5 has entirely pierced the piece of meat 1, in which position thread 6 starting from the opening 19 in the hollow needle extends along the outside of this hollow needle through the piece of meat 1 and back again to the first gripper means 18. The second gripper means 24 still is in its downwardly pivoted position, whereas cutting means 28 has not yet been activated. The welding device 29 still lies outside of the plane of thread 6, as it is in FIG. 2.

Figure 4:
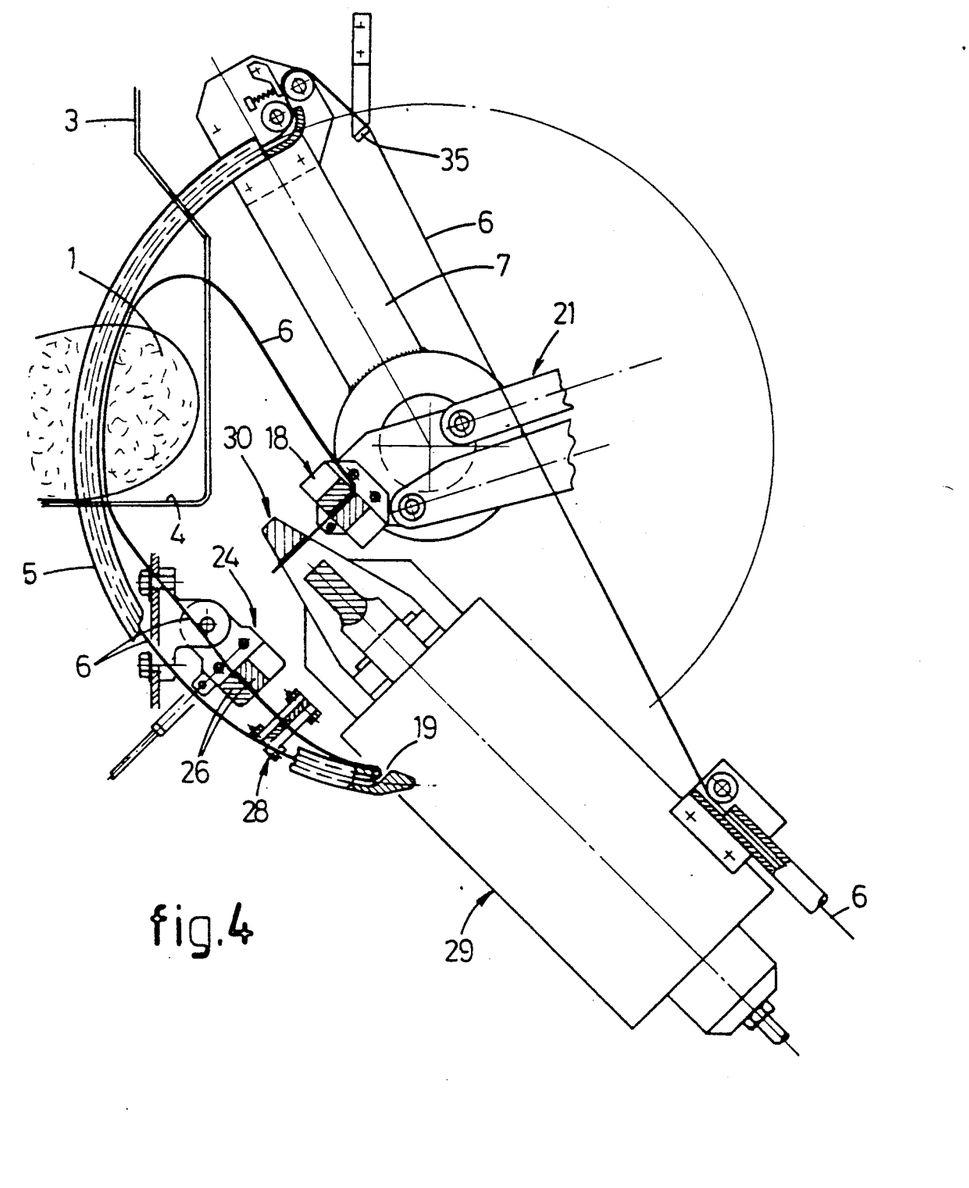

Dashed line $l_3$ represented in FIG. 7 shows the position according to FIG. 4. The needle 5 substantially is in its extreme position in which the thread section extending back from opening 19 has passed cutting means 28 and second gripper means 24. The jaws 26 of the second gripper means 24 are closed thus engaging this thread section. The cutting means 28 has been activated in correspondence with FIG. 7c, thus cutting the thread section between opening 19 and second gripper means 24.

The position of the first gripper means 18 and of welding device 29 has not been changed with respect to FIG. 3.

Figure 5:
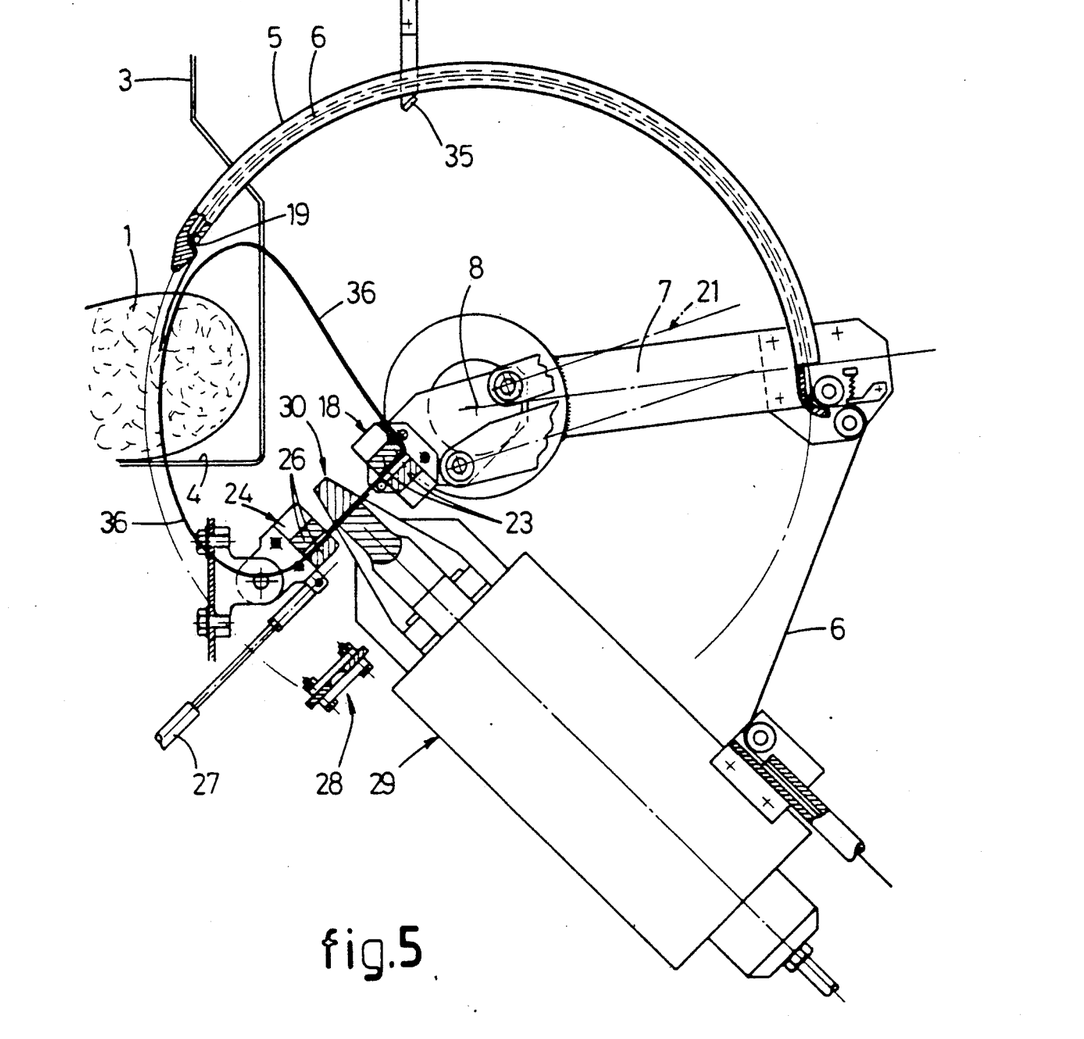

The position of the apparatus shown in FIG. 5 corresponds with line $l_4$ in FIG. 7. In this position the hollow needle 5 is on its way to its starting position and has already disengaged the piece of meat 1. The thread end that projects from the opening 19 again will be positioned correctly by the guiding abutment 35 for the next gripping operation of gripping means 18.

At the represented moment first gripper means 18 however is still in its lowermost position. Relative to FIG. 4 the second gripper means 24 has got a pivoted position, in which both ends of the thread section 36 disengaged by the cutting means 28 are located against each other at the welding head 30 of the welding device 29. Hereby the welding device 29 has been moved upwards perpendicularly to the plane of the drawing, such that the welding head 30 is positioned in the same plane as this thread section 36. The welding head 30 is activated, that means that it is closed and interconnects both loose ends of the thread section 36. Because the closed welding head 30 effectively holds the thread section 36 it is possible to start at this very moment opening the jaws 23 and 26, respectively, of the first gripper means 18 and the second gripper means 24, respectively. This has been represented in FIG. 5.

After completing the welding operation the welding head 30 will be opened, whereas at this moment the jaws 23, 26 of the gripper means 18 and 24 are completely opened. Moreover the first gripper means 18 may be moved vertically upwards again by means of the rod mechanism 21 for obtaining the uppermost position according to FIG. 2. Correspondingly the second gripper means 24 may be moved towards its downwardly pivoted position according to FIG. 2 by means of a motion of the hauling and pressure cable 27.

When according to this both ends of the disengaged thread section 36 have been interconnected and the welding head 30 has been opened the piece of meat 1 may be removed from the product support 4 while pulling the manufactured thread loop outwards through the not represented slot in the casing 3. The thread loop manufactured like this enables suspending the piece of meat.

Figure 6:
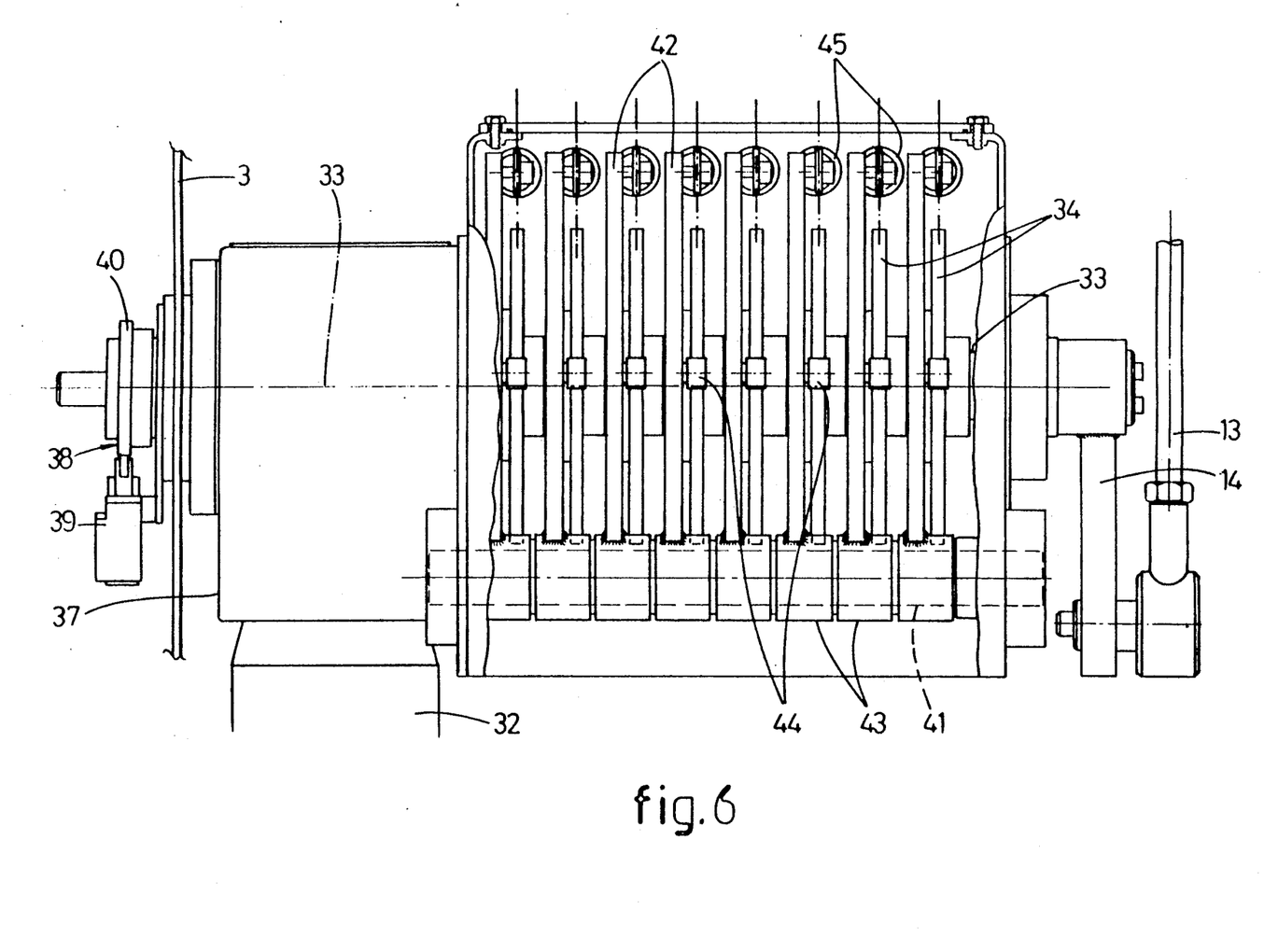
FIG. 6 shows, at a larger scale and partially broken away too, a driving box used in FIG. 1.

FIG. 6 shows on a larger scale and partially broken away one possible embodiment of the driving box 31 for realizing the motions of the several parts of the apparatus. As mentioned before this driving box 31 comprises a shaft 33 that is driven by motor 32 via a transmission box 37. To one end of the shaft 33 a crank rod 14 is attached that activates the drive rod 13 for driving the motion of needle 5. At the opposite end of the shaft 33 a switch mechanism 38 is provided that, in a way known per se, ensures that after activating the apparatus shaft 33 always rotates only one revolution. For this the switch mechanism among others comprises a switch 39 cooperating with a curved disc 40 positioned on shaft 33. Principally this curved disc has such a projection that switch 39, when contacting this projection, disconnects motor 32. By pressing a manual switch motor 32 may be activated so that the projection of the curved disc does no longer engage switch 39 and that rotation of shaft 33 is continued that long until the projection of the curved disc 40 again disactivates switch 39.

In the illustrated embodiment of the driving box 31 it comprises eigth curved discs 34. In parallel to shaft 33 a pivot shaft 41 extends on which arms 42 joined to bushes 43 are rotatingly journalled. Each arm 42 carries a follower roll 44 that due to a tension spring 45 engaging the free end of each arm 42 continuously engages the respective curved disc 34.

It will be understood that by an appropriate choice of the shape of these curved discs 34 the arms 42 will pivot in a certain way as a result of the cooperation between these curved discs 34 and the follower rolls 44; attached to the arms 42 are the previously mentioned hauling and pressure cables (for example 22 and 27), such that finally the motions of the several parts of the apparatus represented in FIG. 7 are obtained.

According to FIG. 6 the driving box 31 comprises eight curved discs of which seven are used for activating parts according to FIGS. 7b until 7h (the needle movement according to FIG. 7a is provided by crank gear 13, 14). The eight curved disc is used as compensating curved disc; this curved disc is shaped such that the resulting torque exerted on the shaft 33 by the remaining curved discs 34 and the crank gear 13, 14 together with the torque exerted by this compensating curved disc remains constant during the entire rotation of said shaft 33. Like this it can be achieved that the required power of motor 32 may be kept to a minimum through an appropriate choice of the shape of this compensating curved disc and the spring constant of the tension spring 45 engaging its arm 42.

The drive of the several parts of the apparatus obtained with the drive box 31 leads to very quickly and accurately displacing these parts.

Figure 8:
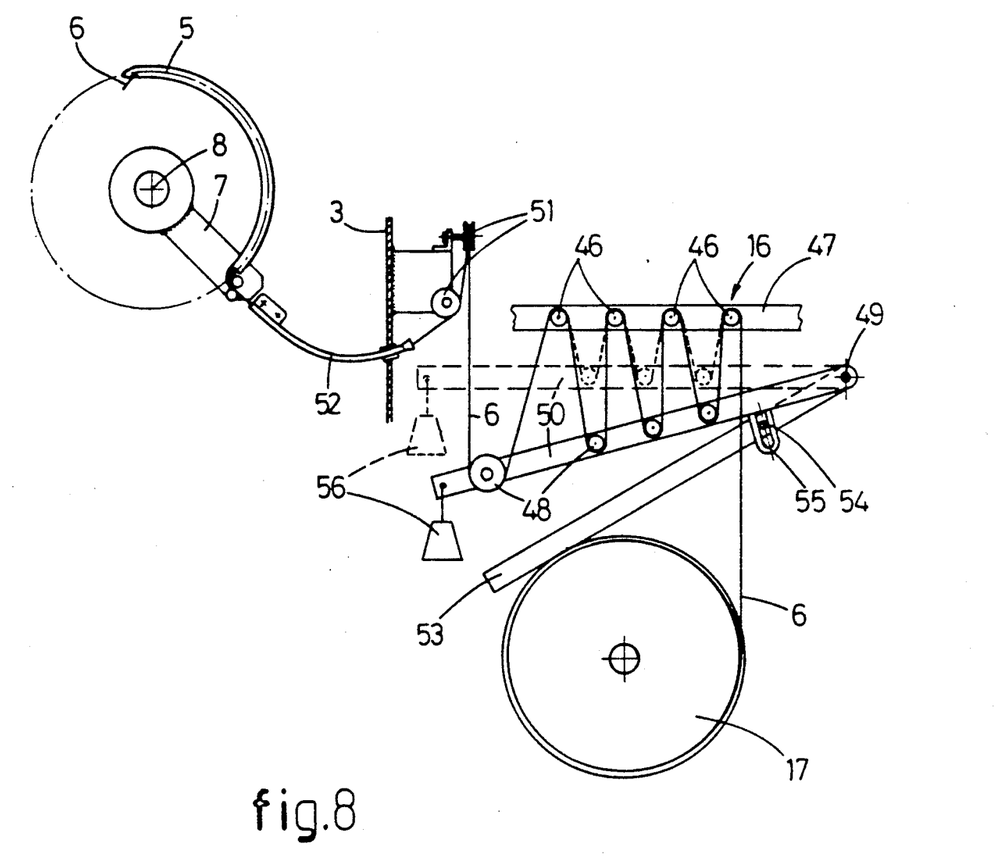
FIG. 8 shows schematically represented a buffer device for the thread supply as used in the apparatus according to FIG. 1.

Finally FIG. 8 shows the principle of a buffer device only schematically indicated in FIG. 1 for the supply of the thread 6 from a thread drum 17. The buffer device 16 comprises a first series of thread guiding rolls 46 attached to a support 47 which is firmly connected with box 3 and a second series of thread guiding rolls 48 provided on a carrier 50 pivotable around pivot 49. As appears clearly from FIG. 8 thread 6 extends alternatingly around thread guiding rolls 46, 48 from one series and the other series. Via further guiding rolls 51 and a tube-like guiding 52 the thread 6 finally reaches the hollow needle 5.

Further thread drum brake 53, that in the illustrated position engages thread drum 17, is pivotable around pivot 49. This thread drum brake 53 carries a pin 54 which is received for a sliding movement in a slot of a bracket 55 attached to carrier 50. Finally one can see that the end of carrier 50 is loaded by a weight 56. It is emphasized that this weight 56 could be replaced by a spring means or alike.

Starting from the position of the carrier 50 represented in full lines and the illustrated position of the hollow needle according to FIG. 8 the thread would be tightened if the hollow needle 5 is rotated, such that initially the thread drum 17 is stopped by the thread drum brake 53 so that carrier 50 is pivoted towards its dotted represented position. Only after hollow needle 5 is pivoted over a certain angle the carrier 50 will be pivoted that far that pin 54 has reached the end of the slot in the bracket 55, such that this bracket 55 by means of pin 54 disengages the thread drum brake 53 from the thread drum 17. In this position the thread drum 17 can rotate and can dispense thread 6.

The moment on which the thread drum brake 53 is disengaged from thread drum 17 corresponds with the moment at which the hollow needle 5 has entirely pierced the food product, for example the piece of meat 1. This moment is represented in FIG. 3. If however, the hollow needle hits a hard object in the piece of meat 1, for example a bone, before reaching the position according to FIG. 3 the thread drum brake 53 has not yet released thread drum 17, such that by moving back the hollow needle 5 the starting position according to FIG. 8 is reached without the thread drum 17 having dispensed an additional amount of thread 6.

As has been noted previously the hollow needle 5 will move back to its starting position if it hits a hard object in the food product to be processed. For avoiding damages of the hollow needle and of the food product (for example to avoid bone splinters) the needle drive preferably can be disengaged automatically from the driving box 31. This may be obtained by providing a free wheel mechanism between shaft 8 and shaft drive arm 9. This mechanism is activated when a preset torque is exceeded. If this free wheel mechanism notes that needle 5 is disengaged an automatic signal is led to driving box 31 that will stop then. Next an automatic reset mechanism will bring back needle 5 to its starting position whereas all other parts of the apparatus will be reset to their starting positions too, such that the mutual relations between all the motions according to FIG. 7 are re-established.

The invention is not limited to the embodiment described before, which can be varied widely within the scope of the invention.

I claim:

1. Apparatus for providing a food product, such as meat, with a thread-like suspension means, comprising a needle movable to and fro for passing the thread loop-like through the food product, wherein the needle comprises a thread guide, the thread extending from a thread supply through the thread guide towards the point of the needle and, for defining the loop, at the outside of the needle back again, the apparatus comprising a first gripper means for gripping the thread end projecting from the thread guide and holding it while moving the needle through the food product, a second gripper means for gripping the thread loop after being moved entirely through the food product by means of the needle, a cutting means for cutting the thread between the second gripper and the point of the needle, and a connecting device for connecting the two ends of the thread section disengaged from the supplied thread and held by the gripper means.

2. Apparatus according to claim 1, characterized in that a driving box comprising curved discs is provided for driving at least the gripper means, the cutting means and the connecting device, said curved discs driving respective hauling and pressure cables connected with the said means and the connecting device.

3. Apparatus according to claim 2, characterized in that the driving box further comprises a compensating curved disc engaged by a spring-loaded abutment means, the spring-load and the shape of the compensating curved disc being such that the resulting torque applied to a driving motor of the driving box by the curved discs and the compensating curved disc continuously remains constant.

4. Apparatus according to claim 2, characterized in that the driving box further comprises a crank gear for driving the needle.

5. Apparatus according to claim 4, characterized in that the needle drive can be disengaged automatically from the driving box when the needle hits a hard object in the food product, such as a bone.

6. Apparatus according to claim 5, characterized in that an automatic resetting mechanism is provided for resetting the driving box and the needle towards the starting position after the needle being disengaged.

7. Apparatus according to claim 1, characterized in that the first gripper means, after gripping the thread end, and the second gripper means, after gripping the thread loop and cutting the thread by the cutting means, are movable such that the ends of the disengaged thread section are positioned against each other.

8. Apparatus according to claim 7, characterized in that the first gripper means is attached to a rod mechanism resulting in being movable to and fro along a substantially rectilinear track from a first position for gripping the thread end projecting from the thread guide towards a second position for positioning the ends of the thread section against each other in cooperation with the second gripper means.

9. Apparatus according to claim 7 or 8, characterized in that the second gripper means is rotatable around a stationary pivot between a first position for gripping the thread loop and a second position for positioning the ends of the thread section against each other in cooperation with the first gripper means.

10. Apparatus according to claim 1, characterized in that the connecting device comprises an ultrasonic welding head known per se.

11. Apparatus according to claim 1, characterized in that the thread supply comprises a thread drum and wherein a thread buffer device is provided between the thread drum and the needle, such that thread is wound off from the thread drum only after the needle has entirely pierced the food product.

12. Apparatus according to claim 11, characterized in that the buffer device comprises two series of relatively offset thread guide rolls of which one series is stationary and of which the second series is positioned below the first series and on a pivotable carrier, the thread being led alternatingly around the thread guide rolls of the first and second series, the pivotable carrier being connected with a thread drum brake in such a way that the brake releases the thread drum when the carrier has pivoted over a preset angle towards the first series of thread guide rolls, the carrier being loaded away from the first series of thread guide rolls.

13. Apparatus according to claim 12, characterized in that the carrier is gravity-loaded.

14. Apparatus according to claim 12 or 13, characterized in that the carrier and the thread drum brake are interconnected by a pin that is received in slot for a limited slideability.

15. Apparatus according to claim 1, characterized in that the needle is curved and follows a circular track.

16. Apparatus according to claim 1, characterized in that the thread is manufactured from a strip-like plastic material.

* * * * *